United States Patent
Hoffmann et al.

(10) Patent No.: US 9,893,563 B2
(45) Date of Patent: Feb. 13, 2018

(54) SYSTEM AND METHOD FOR OPERATING A WIND TURBINE

(71) Applicant: General Electric Company, Schenectady, NY (US)

(72) Inventors: Till Hoffmann, Osnabrueck (DE); Werner Gerhard Barton, Gescher (DE); Hartmut Scholte-Wassink, Lage (DE)

(73) Assignee: General Electric Company, Schenectady, NY (US)

( * ) Notice: Subject to any disclaimer, the term of this patent is extended or adjusted under 35 U.S.C. 154(b) by 71 days.

(21) Appl. No.: 15/019,985

(22) Filed: Feb. 10, 2016

(65) Prior Publication Data
US 2017/0229907 A1 Aug. 10, 2017

(51) Int. Cl.
*F03D 9/00* (2016.01)
*H02J 11/00* (2006.01)
*H02P 9/00* (2006.01)

(52) U.S. Cl.
CPC .............. *H02J 11/00* (2013.01); *F03D 9/003* (2013.01); *H02P 9/007* (2013.01)

(58) Field of Classification Search
CPC . H02J 11/00; H02J 3/386; F03D 9/003; H02P 9/007
USPC .......... 290/44, 55; 307/151, 153, 84, 47, 57, 307/139; 700/286, 292, 287
See application file for complete search history.

(56) References Cited

U.S. PATENT DOCUMENTS

| | | | | |
|---|---|---|---|---|
| 3,764,815 A | * | 10/1973 | Habock | H02P 9/08 290/38 R |
| 5,694,026 A | * | 12/1997 | Blanchet | F01D 15/10 290/27 |
| 6,327,162 B1 | * | 12/2001 | Larsen | H02J 3/1814 307/103 |
| 7,298,055 B2 | * | 11/2007 | Galloway | F03D 9/255 290/44 |
| 7,880,335 B2 | * | 2/2011 | Altenschulte | H01B 7/14 290/55 |
| 8,358,035 B2 | * | 1/2013 | Bright | H02J 3/38 307/84 |
| 8,841,796 B2 | * | 9/2014 | Rosenvard | F03D 7/048 307/11 |
| 9,077,205 B2 | * | 7/2015 | Teichmann | H02J 3/382 |
| 9,334,749 B2 | * | 5/2016 | Das | F01D 15/10 |
| 2007/0120424 A1 | * | 5/2007 | Lombardi | H02P 9/305 307/84 |
| 2009/0322083 A1 | * | 12/2009 | Wagoner | H02J 3/38 290/44 |
| 2012/0136494 A1 | * | 5/2012 | Kirchner | H02J 3/386 700/287 |

(Continued)

*Primary Examiner* — Julio C. Gonzalez-Ramirez
(74) *Attorney, Agent, or Firm* — Dority & Manning, P.A.

(57) ABSTRACT

The present subject matter is directed to a wind turbine electrical power configured to minimize power losses. The power system includes a generator having a generator stator and a generator rotor, a power converter electrically coupled to the generator, a main transformer electrically coupled to the power converter and the power grid, and an auxiliary transformer. More specifically, the main transformer is connected to the power grid via a voltage line comprising a voltage switch gear. Thus, the auxiliary transformer is connected directly to the voltage line, i.e. rather than being connected to the grid through the main transformer.

15 Claims, 6 Drawing Sheets

(56) References Cited

U.S. PATENT DOCUMENTS

| | | | |
|---|---|---|---|
| 2013/0200617 A1* | 8/2013 | Smith | H02P 9/02 290/43 |
| 2013/0229056 A1* | 9/2013 | Teichmann | H02J 3/382 307/18 |
| 2013/0234434 A1* | 9/2013 | Langel | H02H 3/003 290/44 |
| 2013/0264882 A1* | 10/2013 | Abasolo | F03D 9/003 307/80 |
| 2014/0225369 A1* | 8/2014 | Bodewes | F03D 7/04 290/44 |
| 2016/0181909 A1* | 6/2016 | Steimer et al. | F03B 13/06 290/7 |

\* cited by examiner

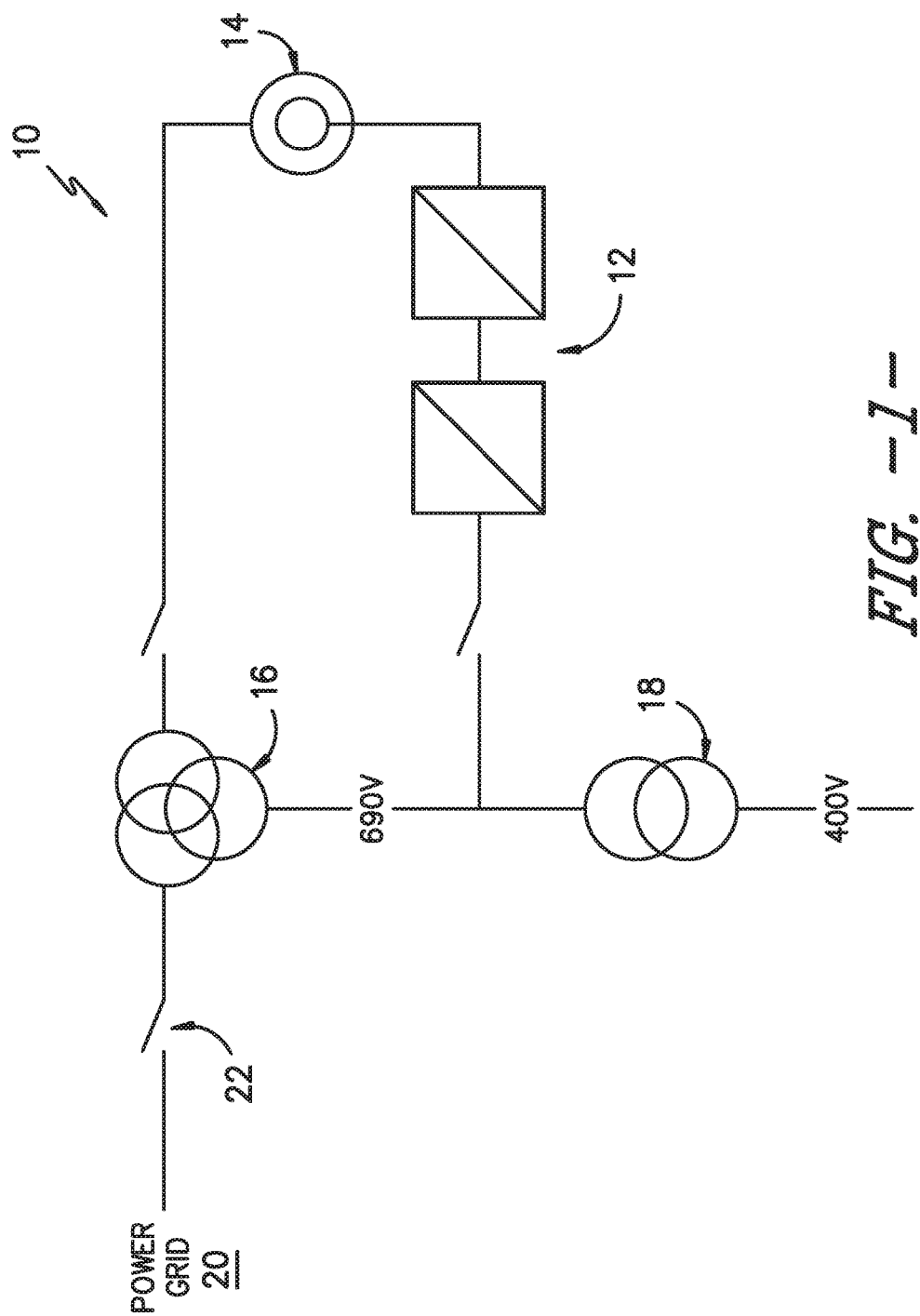
FIG. -1-
PRIOR ART

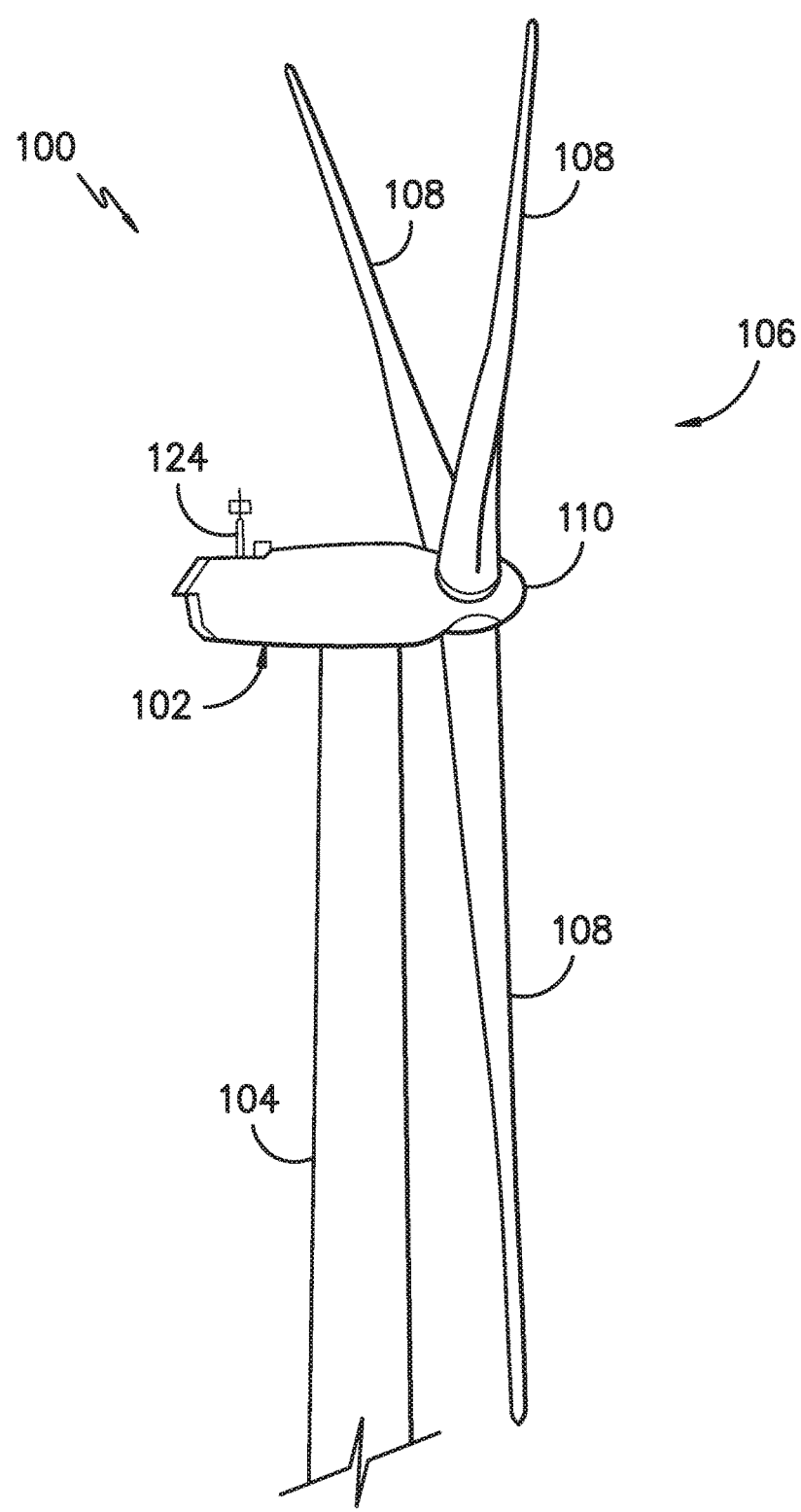
FIG. -2-

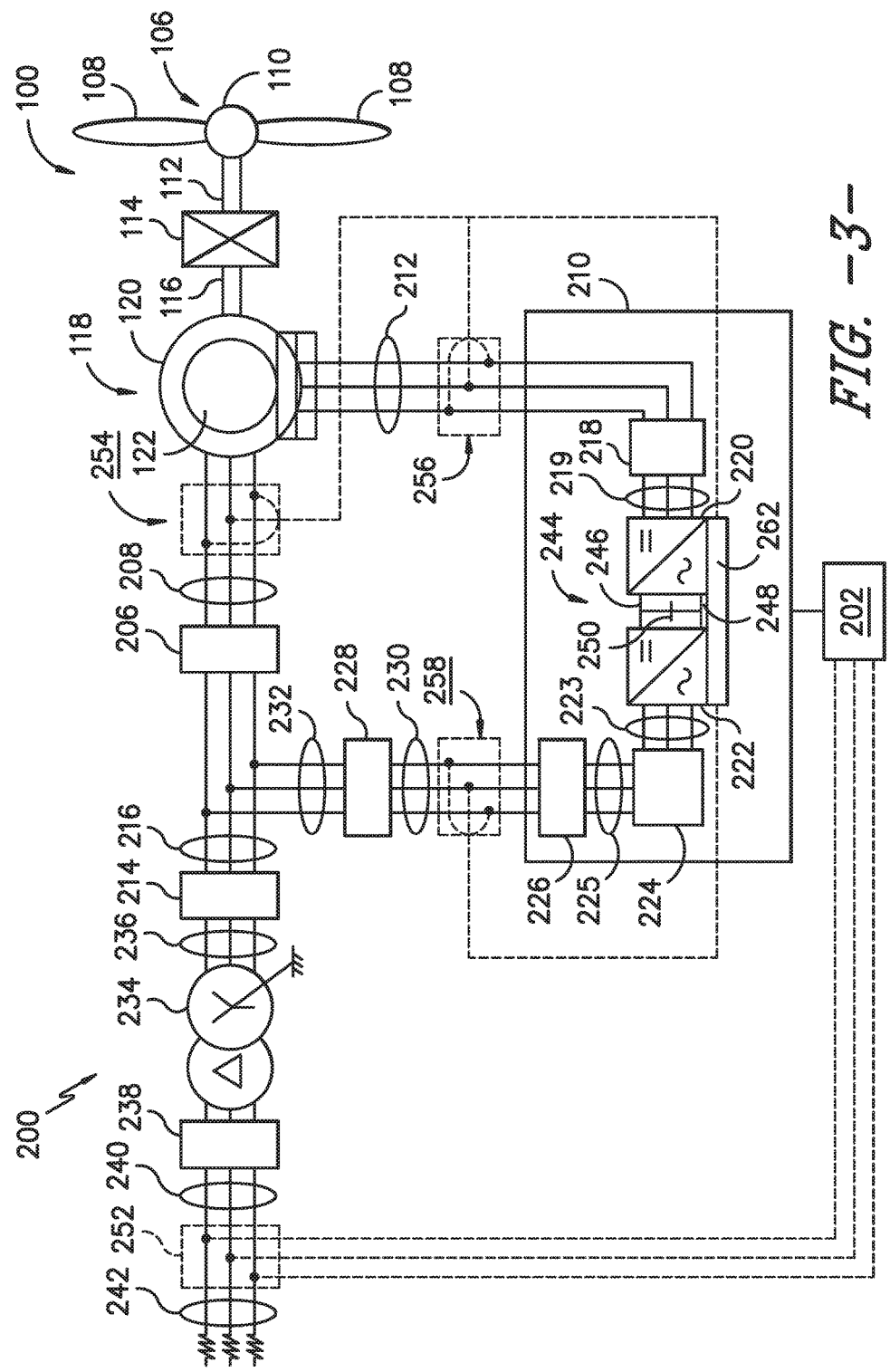
FIG. -3-

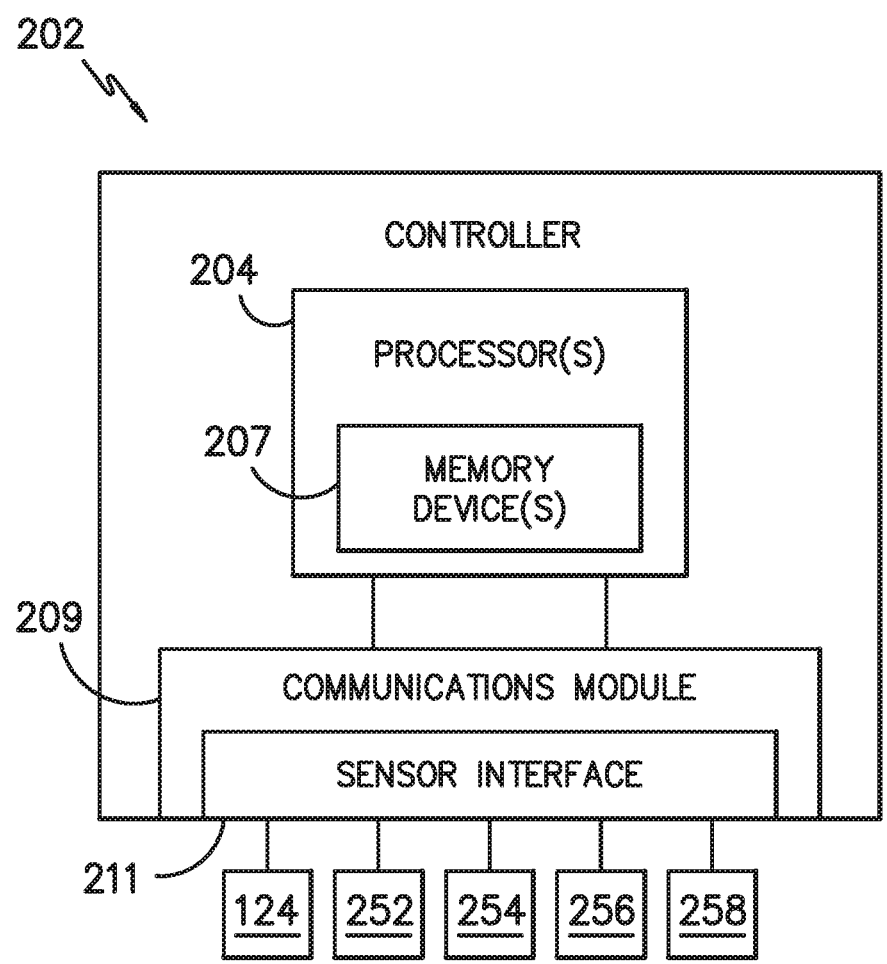
FIG. -4-

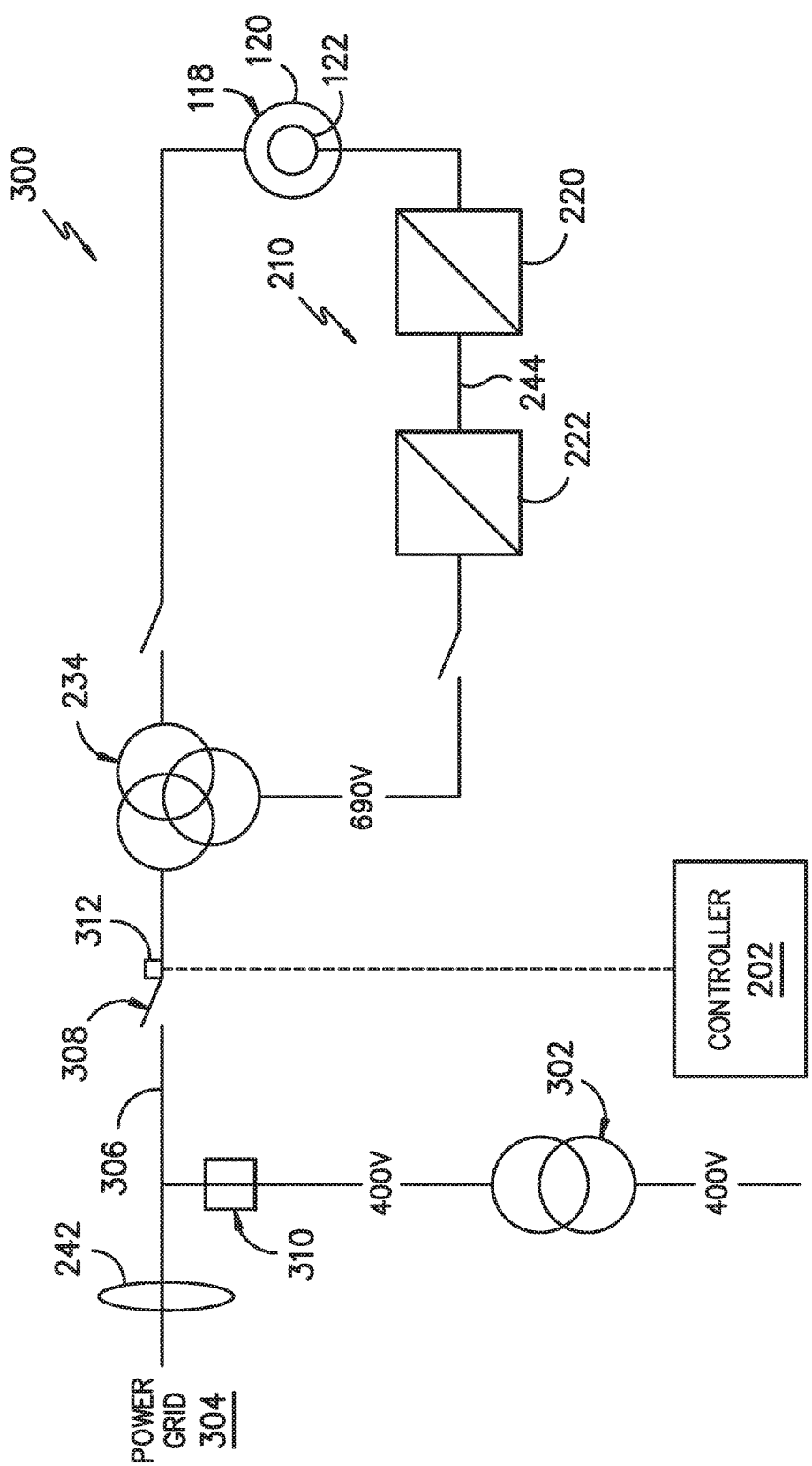
FIG. -5-

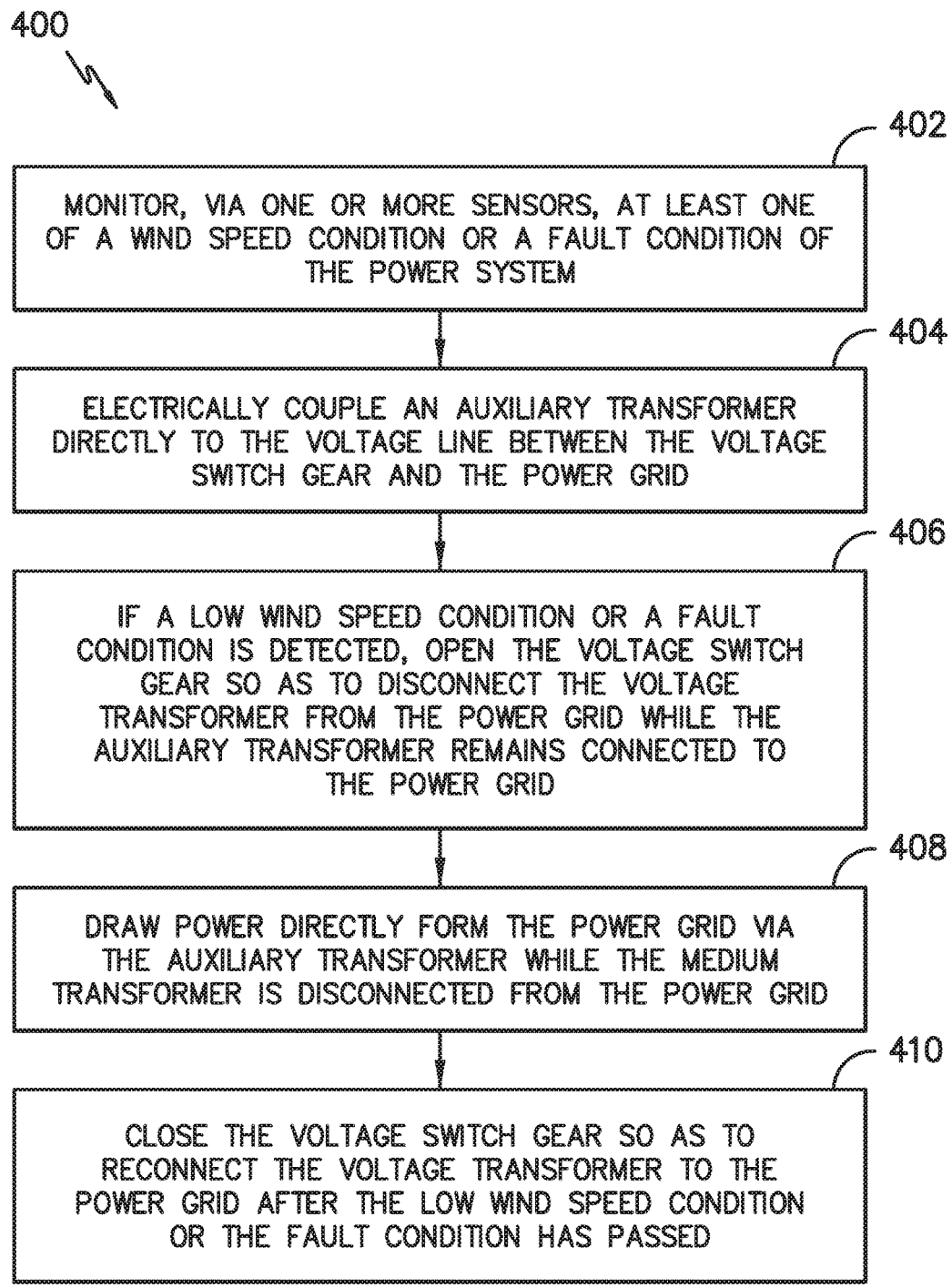
FIG. -6-

SYSTEM AND METHOD FOR OPERATING A WIND TURBINE

FIELD OF THE INVENTION

The present disclosure relates generally to wind turbines and, more particularly, to a system and method for operating a wind turbine during low wind speed or fault conditions so as to minimize power losses.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

During operation, wind impacts the rotor blades and the blades transform wind energy into a mechanical rotational torque that rotatably drives a low-speed shaft. The low-speed shaft is configured to drive the gearbox that subsequently steps up the low rotational speed of the low-speed shaft to drive a high-speed shaft at an increased rotational speed. The high-speed shaft is generally rotatably coupled to a generator so as to rotatably drive a generator rotor. As such, a rotating magnetic field may be induced by the generator rotor and a voltage may be induced within a generator stator that is magnetically coupled to the generator rotor. The associated electrical power can be transmitted to a main transformer that is typically connected to a power grid via a grid breaker. Thus, the main transformer steps up the voltage amplitude of the electrical power such that the transformed electrical power may be further transmitted to the power grid. Further, the main transformer is oftentimes a medium-voltage transformer.

In many wind turbines, the generator rotor may be electrically coupled to a bi-directional power converter that includes a rotor-side converter joined to a line-side converter via a regulated DC link. More specifically, some wind turbines, such as wind-driven doubly-fed induction generator (DFIG) systems or full power conversion systems, may include a power converter with an AC-DC-AC topology.

FIG. 1 illustrates a simplified schematic diagram of an electrical system 10 of a conventional wind turbine illustrating such components. As shown, the generator 14 is electrically coupled to the power converter 12 and the main or medium-voltage (MV) transformer 16. The MV transformer 16 is connected to the power grid 20 via switch gear 22. In addition, as shown, consumers are typically connected to a 690V/400V auxiliary transformer 18 and the auxiliary transformer 18 is connected to the 690V tap of the MV transformer 16. During low wind speed and/or fault conditions, the electrical system 10 is in a stand-by mode with the MV transformer 16 connected to the grid 20, which can cause undesirable power losses.

Accordingly, an improved system and method for operating a wind turbine during low wind speed conditions so as to minimize power losses would be advantageous.

BRIEF DESCRIPTION OF THE INVENTION

Aspects and advantages of the invention will be set forth in part in the following description, or may be obvious from the description, or may be learned through practice of the invention.

In one aspect, the present subject matter is directed to an improved wind turbine electrical power system connected to a power grid having reduced power losses. The wind turbine power system includes a generator having a generator stator and a generator rotor, a power converter electrically coupled to the generator, a main transformer electrically coupled to the power converter and the power grid, and an auxiliary transformer. More specifically, the main transformer is connected to the power grid via a voltage line comprising a voltage switch gear. Thus, the auxiliary transformer is connected directly to the voltage line, i.e. rather than being connected to the grid through the main transformer.

In one embodiment, the auxiliary transformer may be connected directly to the voltage line between the voltage switch gear and the power grid.

In another embodiment, the power system may also include a controller configured to control operation of the wind turbine power system. Thus, in further embodiments, the wind turbine power system may also include one or more sensors configured to monitor the power system for low wind speed conditions and/or fault conditions. As such, during low wind speed and/or fault conditions, the controller is configured to open the voltage switch gear so as to disconnect the main transformer from the power grid.

In additional embodiments, during low wind speed or fault conditions, after disconnecting the main transformer from the power grid, the auxiliary transformer may remain connected to the grid such that it can draw power directly from the power grid via the voltage line. After the low wind speed condition and/or the fault condition have passed, the controller may also be configured to close the voltage switch gear so as to reconnect the main transformer to the power grid.

In another embodiment, the power system may also include an auxiliary fuse between the auxiliary transformer and the voltage line. Further, in certain embodiments, the voltage switch gear may include a motor. In such embodiments, the controller may be configured to control the motors so as to automatically open and close the voltage switch gear.

In another aspect, the present disclosure is directed to a method for operating a wind turbine electrical power system connected to a power grid so as to minimize power losses. The wind turbine electrical power system includes a main transformer electrically coupled to the power grid via a voltage line, e.g. a medium-voltage line. Further, the voltage line includes a voltage switch gear configured between the main transformer and the power grid. Thus, the method includes monitoring, via one or more sensors, at least one of a wind speed condition or a grid condition of the power grid. The method also includes electrically coupling an auxiliary transformer directly to the voltage line. If a low wind speed condition or a fault condition is detected, the method includes disconnecting, via a turbine controller, the main transformer from the power grid while the auxiliary transformer remains connected to the power grid.

In one embodiment, the method may also include electrically coupling the auxiliary transformer directly to the voltage line between the voltage switch gear and the power grid.

In another embodiment, the step of disconnecting the main transformer from the power grid may include opening the voltage switch gear. Further, in additional embodiments, the method may include drawing power directly from the power grid via the auxiliary transformer after disconnecting the main transformer from the power grid.

In additional embodiments, the method may include closing the voltage switch gear, via the turbine controller, so as to reconnect the main transformer to the power grid after the low wind speed condition or the fault condition has passed.

In yet another embodiment, the step of electrically coupling the auxiliary transformer directly to the voltage line may include providing an auxiliary fuse between the auxiliary transformer and the voltage line. In such embodiments, the method may further include controlling, via the turbine controller, a motor of the voltage switch gear so as to automatically open and close the voltage switch gear.

In yet another aspect, the present disclosure is directed to a method for operating a wind turbine electrical power system connected to a power grid so as to minimize power losses. The wind turbine electrical power system includes a main transformer electrically coupled to the power grid via a voltage line. Further, the power system includes a voltage switch gear configured between the main transformer and the power grid. Thus, the method includes monitoring, via one or more sensors, at least one of a wind speed condition or a fault condition of the power system. Another step includes electrically coupling an auxiliary transformer directly to the voltage line between the voltage switch gear and the power grid. If a low wind speed condition or a fault condition is detected, the method may include opening the voltage switch gear so as to disconnect the main transformer from the power grid while the auxiliary transformer remains connected to the power grid. Further, the method includes drawing power directly from the power grid via the auxiliary transformer while the main transformer is disconnected from the power. After the low wind speed condition or the fault condition has passed, the method may also include closing the voltage switch gear so as to reconnect the main transformer to the power grid.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a simplified schematic diagram of a conventional wind turbine electrical power system according to the present disclosure;

FIG. 2 illustrates a perspective view of a portion of one embodiment of a wind turbine according to the present disclosure;

FIG. 3 illustrates a schematic view of one embodiment of an electrical and control system suitable for use with the wind turbine electrical power systems according to the present disclosure;

FIG. 4 illustrates a block diagram of one embodiment of a controller suitable for use with the wind turbine electrical power systems according to the present disclosure;

FIG. 5 illustrates a simplified schematic diagram of one embodiment of a wind turbine electrical power system configured to minimize power losses according to the present disclosure; and FIG. 6 illustrates a flow diagram of one embodiment of a method for operating a wind turbine to minimize power losses according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to a system and method for operating a wind turbine connected to a power grid so as to minimize power losses during low wind speed and/or fault conditions. The wind turbine power system includes a generator having a generator stator and a generator rotor, a power converter electrically coupled to the generator, a main transformer electrically coupled to the power converter and the power grid, and an auxiliary transformer. More specifically, the main transformer is connected to the power grid via a voltage line comprising a voltage switch gear. Thus, the auxiliary transformer is connected directly to the voltage line, i.e. rather than being connected to the grid through the main transformer. Accordingly, the auxiliary transformer can draw power from the power grid even when the main transformer is disconnected. Thus, the system and method of the present disclosure minimize turbine power losses during low wind speed and/or fault conditions.

Referring now to the drawings, FIG. 2 illustrates a perspective view of a portion of an exemplary wind turbine 100 according to the present disclosure that is configured to implement the method and apparatus as described herein. The wind turbine 100 includes a nacelle 102 that typically houses a generator (not shown). The nacelle 102 is mounted on a tower 104 having any suitable height that facilitates operation of wind turbine 100 as described herein. The wind turbine 100 also includes a rotor 106 that includes three blades 108 attached to a rotating hub 110. Alternatively, the wind turbine 100 may include any number of blades 108 that facilitates operation of the wind turbine 100 as described herein. The wind turbine 100 may include a wind speed sensor 124, e.g. such as an anemometer, configured to measure wind speed at or near the wind turbine 100.

Referring to FIG. 3, a schematic view of an exemplary electrical and control system 200 that may be used with the wind turbine 100 is illustrated. During operation, wind impacts the blades 108 and the blades 108 transform wind energy into a mechanical rotational torque that rotatably drives a low-speed shaft 112 via the hub 110. The low-speed shaft 112 is configured to drive a gearbox 114 that subsequently steps up the low rotational speed of the low-speed shaft 112 to drive a high-speed shaft 116 at an increased rotational speed. The high-speed shaft 116 is generally rotatably coupled to a generator 118 so as to rotatably drive a generator rotor 122. In one embodiment, the generator 118 may be a wound rotor, three-phase, double-fed induction (asynchronous) generator (DFIG) that includes a generator stator 120 magnetically coupled to a generator rotor 122. As such, a rotating magnetic field may be induced by the generator rotor 122 and a voltage may be induced within a generator stator 120 that is magnetically coupled to the generator rotor 122. In one embodiment, the generator 118 is configured to convert the rotational mechanical energy to a sinusoidal, three-phase alternating current (AC) electrical energy signal in the generator stator 120. The associated electrical power can be transmitted to a main transformer 234 via a stator bus 208, a stator synchronizing switch 206, a system bus 216, a main transformer circuit breaker 214, and a generator-side bus 236. The main transformer 234 steps up the voltage amplitude of the electrical power such that the transformed electrical power may be further transmitted to a grid via a breaker-side bus 240, a grid circuit breaker 238, and a grid bus 242.

In addition, the electrical and control system 200 may include a wind turbine controller 202 configured to control any of the components of the wind turbine 100. For example, as shown particularly in FIG. 4, the controller 202 may include one or more processor(s) 204 and associated memory device(s) 207 configured to perform a variety of computer-implemented functions (e.g., performing the methods, steps, calculations and the like and storing relevant data as disclosed herein). Additionally, the controller 202 may also include a communications module 209 to facilitate communications between the controller 202 and the various components of the wind turbine 100, e.g. any of the components of FIG. 3. Further, the communications module 209 may include a sensor interface 211 (e.g., one or more analog-to-digital converters) to permit signals transmitted from one or more sensors to be converted into signals that can be understood and processed by the processors 204. It should be appreciated that the sensors (e.g. sensors 252, 254, 256, 258) may be communicatively coupled to the communications module 209 using any suitable means. For example, as shown in FIG. 4, the sensors 252, 254, 256, 258 may be coupled to the sensor interface 211 via a wired connection. However, in other embodiments, the sensors 252, 254, 256, 258 may be coupled to the sensor interface 211 via a wireless connection, such as by using any suitable wireless communications protocol known in the art. As such, the processor 204 may be configured to receive one or more signals from the sensors.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 204 is also configured to compute advanced control algorithms and communicate to a variety of Ethernet or serial-based protocols (Modbus, OPC, CAN, etc.). Additionally, the memory device(s) 207 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 207 may generally be configured to store suitable computer-readable instructions that, when implemented by the processor(s) 204, configure the controller 202 to perform the various functions as described herein.

Referring back to FIG. 3, the generator stator 120 may be electrically coupled to a stator synchronizing switch 206 via a stator bus 208. In one embodiment, to facilitate the DFIG configuration, the generator rotor 122 is electrically coupled to a bi-directional power conversion assembly 210 or power converter via a rotor bus 212. Alternatively, the generator rotor 122 may be electrically coupled to the rotor bus 212 via any other device that facilitates operation of electrical and control system 200 as described herein. In a further embodiment, the stator synchronizing switch 206 may be electrically coupled to a main transformer circuit breaker 214 via a system bus 216.

The power conversion assembly 210 may include a rotor filter 218 that is electrically coupled to the generator rotor 122 via the rotor bus 212. A rotor filter bus 219 electrically couples the rotor filter 218 to a rotor-side power converter 220. Further, the rotor-side power converter 220 may be electrically coupled to a line-side power converter 222 via a single direct current (DC) link 244. Alternatively, the rotor-side power converter 220 and the line-side power converter 222 may be electrically coupled via individual and separate DC links. In addition, as shown, the DC link 244 may include a positive rail 246, a negative rail 248, and at least one capacitor 250 coupled therebetween.

In addition, a line-side power converter bus 223 may electrically couple the line-side power converter 222 to a line filter 224. Also, a line bus 225 may electrically couple the line filter 224 to a line contactor 226. In addition, the line filter 224 may include a line reactor (not shown). Moreover, the line contactor 226 may be electrically coupled to a conversion circuit breaker 228 via a conversion circuit breaker bus 230. In addition, the conversion circuit breaker 228 may be electrically coupled to the main transformer circuit breaker 214 via system bus 216 and a connection bus 232. The main transformer circuit breaker 214 may be electrically coupled to an electric power main transformer 234 via a generator-side bus 236. The main transformer 234 may be electrically coupled to a grid circuit breaker 238 via a breaker-side bus 240. The grid circuit breaker 238 may be connected to the electric power transmission and distribution grid via a grid bus 242.

In operation, alternating current (AC) power generated at the generator stator 120 by rotation of the rotor 106 is provided via a dual path to the grid bus 242. The dual paths are defined by the stator bus 208 and the rotor bus 212. On the rotor bus side 212, sinusoidal multi-phase (e.g. three-phase) AC power is provided to the power conversion assembly 210. The rotor-side power converter 220 converts the AC power provided from the rotor bus 212 into DC power and provides the DC power to the DC link 244. Switching elements (e.g. IGBTs) used in bridge circuits of the rotor side power converter 220 can be modulated to convert the AC power provided from the rotor bus 212 into DC power suitable for the DC link 244.

The line side converter 222 converts the DC power on the DC link 244 into AC output power suitable for the electrical grid bus 242. In particular, switching elements (e.g. IGBTs) used in bridge circuits of the line side power converter 222 can be modulated to convert the DC power on the DC link 244 into AC power on the line side bus 225. The AC power from the power conversion assembly 210 can be combined with the power from the stator 120 to provide multi-phase power (e.g. three-phase power) having a frequency maintained substantially at the frequency of the electrical grid bus 242 (e.g. 50 Hz/60 Hz). It should be understood that the rotor-side power converter 220 and the line-side power converter 222 may have any configuration using any switching devices that facilitate operation of electrical and control system 200 as described herein.

Further, the power conversion assembly 210 may be coupled in electronic data communication with the turbine controller 202 and/or a separate or integral converter controller 262 to control the operation of the rotor-side power converter 220 and the line-side power converter 222. For example, during operation, the controller 202 may be configured to receive one or more voltage and/or electric current measurement signals from the first set of voltage and electric current sensors 252. Thus, the controller 202 may be configured to monitor and control at least some of the operational variables associated with the wind turbine 100 via the sensors 252. In the illustrated embodiment, each of the sensors 252 may be electrically coupled to each one of the three phases of the power grid bus 242. Alternatively, the sensors 252 may be electrically coupled to any portion of electrical and control system 200 that facilitates operation of electrical and control system 200 as described herein. In addition to the sensors described above, the sensors may also include a second set of voltage and electric current sensors 254, a third set of voltage and electric current sensors 256, a fourth set of voltage and electric current sensors 258 (all shown in FIG. 3), and/or any other suitable sensors.

It should also be understood that any number or type of voltage and/or electric current sensors may be employed within the wind turbine 100 and at any location. For example, the sensors may be current transformers, shunt sensors, rogowski coils, Hall Effect current sensors, Micro Inertial Measurement Units (MIMUs), or similar, and/or any other suitable voltage or electric current sensors now known or later developed in the art.

Thus, the converter controller 262 is configured to receive one or more voltage and/or electric current feedback signals from the sensors 252, 254, 256, 258. More specifically, in certain embodiments, the current or voltage feedback signals may include at least one of line current feedback signals, line-side converter feedback signals, rotor-side converter feedback signals, stator current feedback signals, line voltage feedback signals, or stator voltage feedback signals. For example, as shown in the illustrated embodiment, the converter controller 262 receives voltage and electric current measurement signals from the second set of voltage and electric current sensors 254 coupled in electronic data communication with stator bus 208. The converter controller 262 may also receive the third and fourth set of voltage and electric current measurement signals from the third and fourth set of voltage and electric current sensors 256, 258. In addition, the converter controller 262 may be configured with any of the features described herein in regards to the main controller 202. Further, the converter controller 262 may be separate from or integral with the main controller 202. As such, the converter controller 262 is configured to implement the various method steps as described herein and may be configured similar to the turbine controller 202.

Referring now to FIG. 5, a simplified, schematic view of one embodiment of a wind turbine electrical power system 300 configured to minimize power losses is illustrated. As shown, the wind turbine electrical power system 300 includes a generator 118 having a generator stator 120 and a generator rotor 122, a power converter 210 electrically coupled to the generator 118, a main transformer 234, i.e. a medium-voltage transformer, electrically coupled to the power converter 210 and the power grid 304 via grid bus 242, and an auxiliary transformer 302. More specifically, as shown, the main transformer 234 may be connected to the power grid 304 via a voltage line 306, i.e. a medium-voltage line, having a corresponding voltage switch gear 308. Thus, as shown, the auxiliary transformer 302 may be connected directly to the voltage line 306, i.e. rather than being connected to the power grid 304 through the main transformer 234 (as shown in FIG. 1 that illustrates a conventional system 10). More specifically, as shown, the auxiliary transformer 302 may be connected directly to the voltage line 306 between the voltage switch gear 308 and the power grid 304.

In another embodiment, as mentioned, the electrical power system 300 may include controller, e.g. such as turbine controller 202, that is configured to control operation of the power system 300. Thus, in further embodiments, the sensors (e.g. sensors 124, 252, 254, 256, 258) are configured to monitor the power system 300 for low wind speed conditions and/or fault conditions. As such, if low wind speed conditions and/or fault conditions are detected, the controller 202 is configured to open the voltage switch gear 308 so as to disconnect the main transformer 234 from the power grid 304. More specifically, in certain embodiments, the voltage switch gear 308 may include a motor 312. Thus, the controller 202 may be configured to control the motor 312 so as to automatically open and close the voltage switch gear 308.

In additional embodiments, the auxiliary transformer 302 may remain connected to the grid 304 during such disconnection, thereby drawing power directly from the power grid 304 via the voltage line 306 during low wind speed and/or fault conditions. Thus, the auxiliary transformer 234 can continue to maintain operational limits, such that the turbine controller 202, anemometers, heaters, fans, etc. can stay operational. After the low wind speed and/or fault conditions have passed, the controller 202 is configured to close the voltage switch gear 308 so as to reconnect the main transformer 234 to the power grid 304. In another embodiment, the power system 300 may also include an auxiliary fuse 310 between the auxiliary transformer 302 and the voltage line 306.

Referring now to FIG. 6, a flow diagram of one embodiment of a method 400 for operating the power system 300 of FIG. 5 so as to minimize power losses is illustrated. As shown at 402, the method 400 includes monitoring, via one or more sensors (e.g. sensors 124, 252, 254, 256, 258), at least one of a wind speed condition or a grid condition of the power grid 304. More specifically, the wind speed condition may include a low wind speed condition. As used herein, a low wind speed condition may generally refer to a wind speed value lower than a cut-in wind speed. The cut-in wind speed generally refers to the wind speed at which the wind turbine begins to generate power. Thus, for many wind turbines, the cut-in wind speed may be from about 3 meters/second (m/s) to about 5 m/s. As such, low wind speeds may include wind speed values lower than about 3 m/s. It should be understood, however, that low wind speeds may vary from turbine to turbine. The grid conditions as described herein may generally refer to any grid condition that indicates the presence of a fault in the power grid 304.

As shown at 404, the method 400 may also include electrically coupling the auxiliary transformer 302 directly to the medium voltage line 306. More specifically, as shown, the method 400 may also include electrically coupling the auxiliary transformer 302 directly to the voltage line 306 between the voltage switch gear 308 and the power grid 304. In addition, in certain embodiments, the step of electrically coupling the auxiliary transformer 302 directly to the medium voltage line 306 may include providing an auxiliary fuse 310 between the auxiliary transformer 302 and the voltage line 306. In such embodiments, the method 400 may further include controlling, via the turbine controller 202, motors 312, 314 of the voltage switch gear 308 so as to automatically open and/or close the voltage switch gear 308 in response to low wind speed and/or fault conditions.

As such, as shown at 406, if a low wind speed condition or a fault condition is detected, the method 400 may include disconnecting, via the turbine controller 202, the main transformer 234 from the power grid 304 while the auxiliary transformer 302 remains connected to the power grid 304. More specifically, in certain embodiments, the step of disconnecting the main transformer 234 from the power grid 304 may include opening the voltage switch gear 308, i.e. the controller 202 may send a signal to the motor 312 of the voltage switch gear 308 to open.

Further, as shown at 408, the method 400 includes drawing power directly from the power grid 304 via the auxiliary transformer 302 while the main transformer 234 is disconnected from the power grid 304. After the low wind speed condition and/or the fault condition has passed, as shown at 210, the method 400 includes closing the voltage switch gear 308, e.g. via the turbine controller 202, so as to reconnect the main transformer 234 to the power grid 304. Determining whether the low wind speed condition and/or the fault condition has passed can be determined by the sensors as described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A wind turbine electrical power system connected to a power grid, the wind turbine electrical power system comprising:
   a generator comprising a generator stator and a generator rotor;
   a power converter electrically coupled to the generator;
   a main transformer electrically coupled to the power converter and the power grid, the main transformer connected to the power grid via a voltage line comprising a voltage switch gear;
   an auxiliary transformer connected directly to the voltage line, wherein the auxiliary transformer is configured to draw power directly from the power grid via the voltage line;
   one or more sensors for monitoring a wind speed near the wind turbine electrical power system; and,
   a controller communicatively coupled to the one or more sensors, wherein, when the wind speed is below a cut-in wind speed of the wind turbine electrical power system, the controller opens the voltage switch gear to disconnect the main transformer from the power grid and, after disconnecting the main transformer from the power grid, the auxiliary transformer draws power directly from the power grid via the voltage line.

2. The power system of claim 1, wherein the auxiliary transformer is connected directly to the voltage line between the voltage switch gear and the power grid.

3. The power system of claim 1, wherein, after the low wind speed conditions have passed, the controller is configured to close the voltage switch gear so as to reconnect the main transformer to the power grid.

4. The power system of claim 1, further comprising an auxiliary fuse between the auxiliary transformer and the voltage line.

5. The power system of claim 4, wherein the voltage switch gear comprises a motor, the controller being configured to control the motor so as to automatically open and close the voltage switch gear.

6. A method for operating a wind turbine electrical power system connected to a power grid so as to minimize power losses, the wind turbine electrical power system having a main transformer electrically coupled to the power grid via a medium voltage line having a voltage switch gear, the method comprising:
   monitoring, via one or more sensors, a wind speed near the wind turbine electrical power system;
   electrically coupling an auxiliary transformer directly to the medium voltage line; and,
   if the wind speed is less than a cut-wind speed of the wind turbine electrical power system, disconnecting, via a turbine controller, the main transformer from the power grid while the auxiliary transformer remains connected to the power grid and draws power directly from the power grid via the medium voltage line.

7. The method of claim 6, further comprising electrically coupling the auxiliary transformer directly to the medium voltage line between the voltage switch gear and the power grid.

8. The method of claim 7, wherein disconnecting the main transformer from the power grid comprises opening the voltage switch gear.

9. The method of claim 8, wherein, after the wind speed increases above the cut-in wind speed, the method comprises closing the voltage switch gear via the turbine controller so as to reconnect the main transformer to the power grid.

10. The method of claim 6, further comprising providing an auxiliary fuse between the auxiliary transformer and the voltage line.

11. The method of claim 10, further comprising controlling, via the turbine controller, a motor of the voltage switch gear so as to automatically open and close the voltage switch gear.

12. A method for operating a wind turbine electrical power system connected to a power grid so as to minimize power losses, the wind turbine electrical power system having a main transformer electrically coupled to the power grid via a voltage line having a voltage switch gear; the method comprising:
   monitoring, via one or more sensors, a wind speed near the wind turbine electrical power system;
   electrically coupling an auxiliary transformer directly to the voltage line;
   if the wind speed drops below a cut-in wind speed of the wind turbine electrical power system, opening the voltage switch gear so as to disconnect the main transformer from the power grid while the auxiliary transformer remains connected to the power grid;

drawing power directly from the power grid via the auxiliary transformer while the main transformer is disconnected from the power grid; and, closing the voltage switch gear so as to reconnect the main transformer to the power grid after the wind speed increases above the cut-in wind speed.

13. The method of claim 12, further comprising electrically coupling the auxiliary transformer directly to the voltage line between the voltage switch gear and the power grid.

14. The method of claim 13, further comprising controlling, a turbine controller, a motor of the voltage switch gear so as to automatically open and close the voltage switch gear.

15. The method of claim 12, further comprising providing an auxiliary fuse between the auxiliary transformer and the voltage line.

* * * * *